May 24, 1932.　　　L. DE FOREST　　　1,859,435
SOUND ON FILM PHONOGRAPH
Filed July 3, 1931　　　2 Sheets-Sheet 1

May 24, 1932.   L. DE FOREST   1,859,435
SOUND ON FILM PHONOGRAPH
Filed July 3, 1931   2 Sheets-Sheet 2

Inventor
Lee De Forest
By
David Petton Moore
Attorney

Patented May 24, 1932

1,859,435

UNITED STATES PATENT OFFICE

LEE DE FOREST, OF HOLLYWOOD, CALIFORNIA, ASSIGNOR TO GENERAL TALKING PICTURES CORPORATION, OF NEW YORK, N. Y., A CORPORATION OF NEW YORK

SOUND-ON-FILM PHONOGRAPH

Application filed July 3, 1931. Serial No. 548,653.

The present invention relates to improvements in sound-on-film reproducing apparatus, one object of the invention being the provision of an apparatus in which a sound-on-film is provided with a plurality of parallel longitudinally disposed sound tracks, and in which an apparatus is provided to cooperate therewith, to progressively move a film through the same and alternately shift the optical system so that the same will scan one sound track at a time, thus providing on a single film sound track capacities far beyond the ordinary realm, and as particularly shown in my Patent 1,802,595 dated April 28, 1931. In the aforementioned patent a slit block is controlled through film actuated mechanism to be disposed in line with one sound track at a time, while in the present instance the optical system including the exciter lamp is oscillated on an axis so that the light image is projected so as to scan only one sound track at a time.

A further object of this invention is the provision of a novel mechanism for manually and automatically shifting and holding the optical system in its selected position, and for returning the same to normal position, the scanning operation thereof being automatically controlled by the film and coordinating mechanism, associated therewith, the latter being practically identical with that shown in my previous patent.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:

Figure 5 is a diagrammatic view of the circuits of the optical system controlling mechanism, the same being supplemental to the diagram as illustrated in Figure 1.

Figure 1:
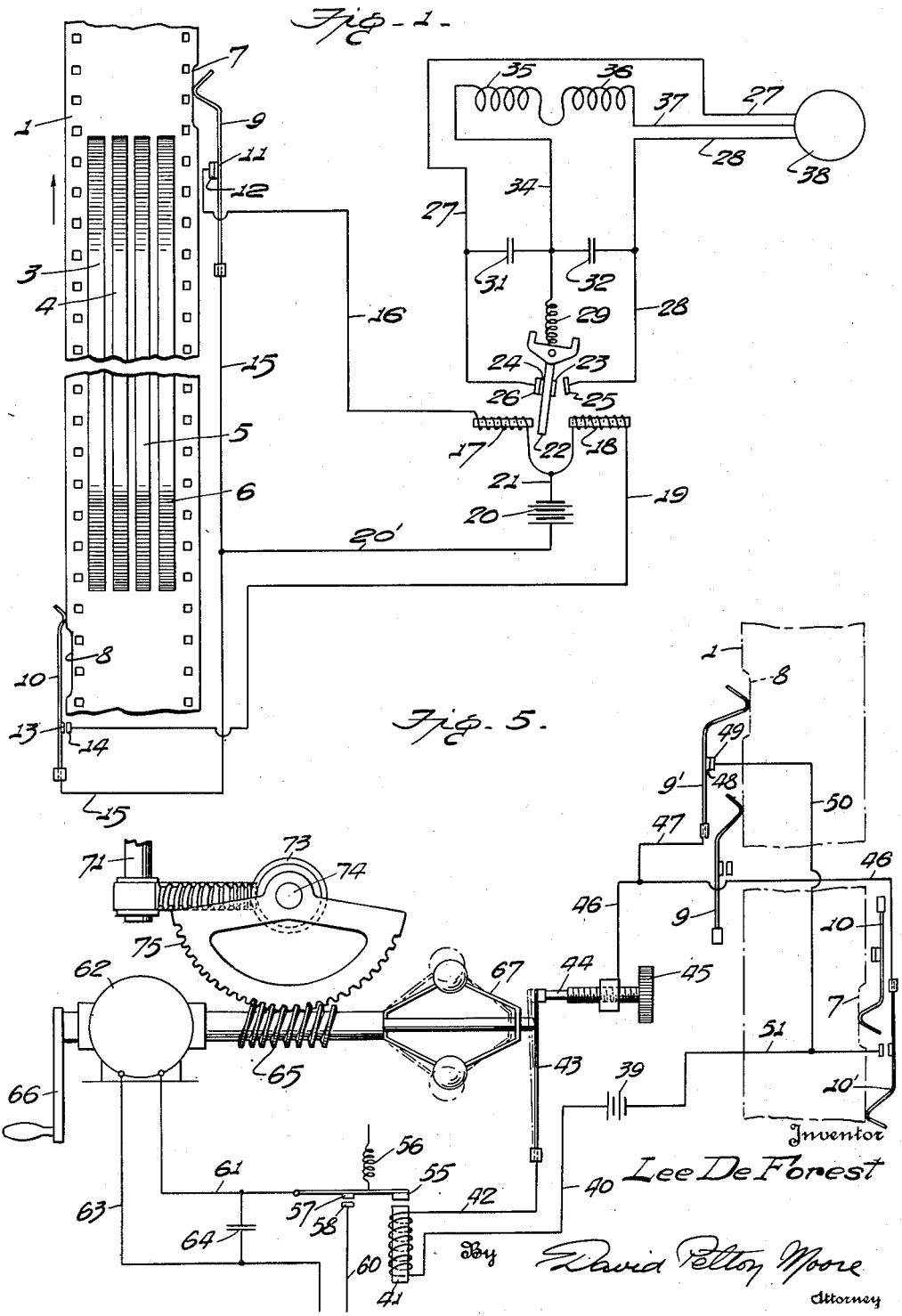
Figure 1 is a diagrammatic illustration of the apparatus controlled through the film for controlling the operation of an electric motor.
Figure 2:
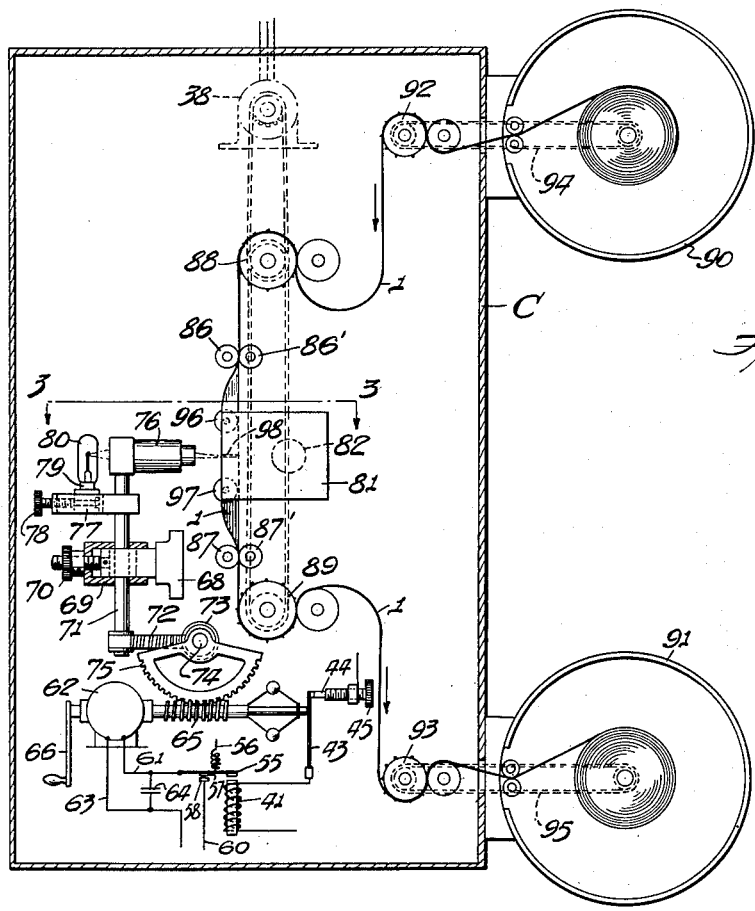
Figure 2 is a vertical sectional view through the casing of the apparatus with the mechanism of the present reproducing apparatus shown in side elevation.

This invention is designed for reproducing sound from a plural sound track film without reference to any motion picture apparatus, it being actually a sound-on-film phonograph and although not illustrated a photo electric cell as will presently appear is adapted to be connected to an amplifier or loud speaker, or a radio apparatus with its loud speaker so as to utilize the same for home and other purposes. With the apparatus here employed, the film per se through a mechanism disposed in the path thereof, as in my former patent, controls a shifting device so that at the end or approaching the end of one sound track the film progressing mechanism is halted and reversed and the scanning device is operated so that the next succeeding sound track is scanned.

To more fully understand the present invention, reference may be had to the accompanying drawings in which the numeral 1 designates a film strip having a plurality of longitudinally disposed and parallel sound tracks, 3, 4, 5 and 6, said film being as usual provided with two series of sprocket openings 2.

Upon opposite sides and adjacent to the ends of the various sound tracks are edged notches 7 and 8 respectively, which control respectively the spring arms 9 and 10.

These arms in turn control the respective switches 11—12 and 13—14 and through these switches, as in the former application, cause the stopping of the film progressing motor 38, the reversal thereof and as will presently appear, the control of the scanning device.

A circuit controlled by the notch 7 through the member 9, consists of a battery 20, a branch conductor 21, an electromagnet 17, a conductor 16, contacts 12 and 11, a member 9, and conductors 15 and 20, while the second circuit is closed by the notch 8 and includes the battery 20, the branch conductor 21, an electromagnet 18, which is opposed to the electromagnet 17, a conductor 10, the contacts 14 and 13, the member 10, and the conductors 15 and 20'.

The electromagnets 17 and 18 actuate the armature switch 22 which is normally held in either biased position by means of a spring 29 so that either pair of the contacts 23 and 25 or 24 and 26 are closed, and through this switch an electric motor 38 is operated in a forward or reverse direction according to the position of the armature switch 22. Condensers 31 and 32 are connected respectively across the conductors 27—34 and 34—28, to suppress the spark due to the breaking at the contacts 24—26 and 23—25 and thus avoid a loud click in the loud speaker.

Current is supplied to the motor 38 by closing a suitable form of switch (not shown) and the film is moved through the mechanism causing sound to be reproduced from as for instance the sound track 3. It is assumed in this description that the film in its first run through the machine is moved in the direction indicated by the arrow in Fig. 1. Thus when the film is moved the proper distance to complete the reproduction from the sound track 3, the spring finger 10 drops into the notch 8 in the film and thus closes the circuit heretofore described inasmuch as contacts 13 and 14 are closed. As a result the electromagnet 18 is energized and the armature switch 22 is moved to the right so that the current which was formerly flowing through the wire 27 and contacts 26 and 24, the armature lever 22, wire 29, contacts 30—31, wire 34, filed windings 35—36 back to the current source through the wire 37 is reversed and now flows from the current source through the wire 37, field windings 36 and 35, wire 34, contacts 31 and 30, wire 29, armature lever 22, contacts 23 and 25 and thence to the current source through the wire 28. Thus the motor 38 is reversed and the mechanism of the machine is also reversed so as to cause the film to travel in the opposite direction, or in a reverse direction from one magazine to the other.

Instead of moving the slit block through the instrumentality of the armature lever 22 as in my before mentioned patent, I provide as illustrated in Figure 6 an additional set of spring contact members 9' and 10' and these are so positioned as to be controlled substantially simultaneously with the spring members 9 and 10. In this instance, when the spring member 9' enters the notch 8, the following circuit is completed and includes the battery 39, a conductor 40, a relay or electromagnet 41, a conductor 42, a flat spring contact 43, a contact control 44, having a time lag adjustment 45, conductors 46—47, spring contact 9', contacts 48—49 and conductors 50 and 51 the purpose of which will presently appear.

The circuit controlled by the spring contact 10' includes the battery 39, the conductor 40, the relay or electromagnet 41, the conductor 42, the flat spring contact 43, the contact control 44, the conductor 46, the spring contact 10', contact points 55 and 56 and the conductor 51. This circuit controls an armature switch 55 normally held in open position by a spring 56 which switch when either one of the contacts 9' or 10' is brought into play, causes the armature 55 to be pulled toward the electromagnet and held there for a predetermined period, the purpose of which will presently appear. This armature switch 55 when actuated by the electromagnet bridges contacts 57—58 to close a circuit including a power source (not shown) a conductor 60, contacts 58—59, conductor 61, a shifting motor 62 and a conductor 67, a condenser 64 being bridged across the line to prevent any undue noise due to the sparking at contacts 58—59 from affecting the amplifying mechanism. The shifting motor has connected to its shaft a worm 65, at one end, and a manually operated handle or crank 66 at the opposite end, thus providing two means for operating the worm, the electric motor for operating it for shifting positions and the crank for re-setting the worm and its co-ordinated mechanisms. Attached to the worm at the outer end thereof is a ball or centrifugal governor 67, which normally holds spring contact 43 in engagement with the contact 44, the normal tendency of the spring contact being to move to the left as viewed in Figure 4, so that when the worm has rotated a pre-determined number of revolutions and has attained speed, the balls thereof will move to the position as shown in dotted lines to permit the spring contact 43 to release the contact 44 and thus de-energize the relay 41 and free the armature switch 55, to the action of its spring 56. Thus at a pre-determined number of rotations of the worm by the shifting motor, the circuit to the motor will be opened and the mechanism controlled by the worm will be brought to a halt and held in such position.

Mounted within the casing C, is a supporting arm 68, to which is attached a bearing 69, adjustably connected thereto by means of the screw 70 so that the vertical shaft 71 may be adjusted inwardly or outwardly, to regulate the focal adjustment of the optical system. To the lower end of the shaft 71 is connected a toothed segment 72 controlled by a worm 73, mounted upon a shaft 74 which in turn is oscillated through the instrumentality of the segmental gear 75, the latter gear being in mesh at all times with the worm 65. Thus will be seen that as the shifting motor is operated, the gear 75 will be moved a pre-determined distance and through the worm 73 and the segment 72 will in turn oscillate shaft 71.

Carried by the shaft 71, at the upper end thereof, is an optical system 76 and an arm 77 which has adjustably connected thereto, through an adjusting screw 78 a socket member 79, carrying an exciter lamp 80. Through this means the filament of the exciter lamp may be adjusted relatively to the optical system and will bodily swing with the optical system, the shaft 71 being the axis of the complete assembly.

Figure 3:
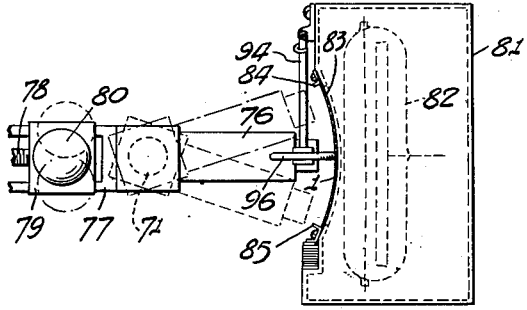
Figure 3 is a section taken on line 3—3 of Figure 2.
Figure 4:
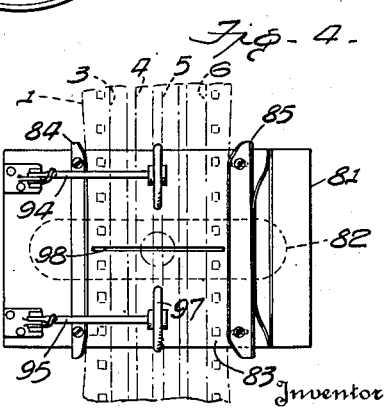
Figure 4 is a front elevation of the film guiding and photo electric cell carrying member of the present apparatus.

Mounted in the casing is a photoelectric cell housing 81 having removably mounted thereto a photoelectric cell 82 which is disposed to be aligned with the optical system 76 so that the light beam image projected therefrom through the film 1 and aperture 98 will affect the photoelectric cell, and therefore the photoelectric cell amplifier and any other amplifying mechanism (not shown) to reproduce the sound through any type of reproducing mechanism such as a dynamic or other type of loud speaker. In the present instance it is desirable and necessary that the portion of the film passed in front of the housing 81 shall be curved transversely and such curve must be on an arc the centre of which is the axis of the shaft 71 and the optical system must be so moved and halted in its operation as to scan selectively the surface of the film and project the beam image of the light from the exciter lamp 80 upon either one of the selected sound tracks 3, 4, 5 or 6. To accomplish this, there is formed in front of the photoelectric cell casing a concaved, highly polished and smooth surface 83, aligned with the respective guides 84 and 85 and between which the film is passed between the respective pairs of guide rollers 86—86', and 87—87', the film being further operated in its progressive action through the respective sprocket rollers 88 and 89 which are driven to pull the film upwardly and downwardly respectively. The film as here shown, is delivered from the respective magazines 90 and 91 by the respective take-up sprockets 92—93, the sprockets 88 and 89 being the driven sprockets from the reversible motor 38, as is clearly apparent. Connected to and operated by the respective take-up sprockets 92—93 are take-up belts 94—95 so that when the film is being moved from the magazine 90 to the magazine 91 the proper tension will be placed upon the film entering the magazine 91, or vice-versa. In order to maintain the film 1 in the position as shown in Figures 3 and 4, there is connected or mounted upon the film side of the housing 81, the two spring arms 94 and 95, the free ends of which are disposed to overlie the film and exert an inward tension upon the film engaging rollers 96—97, the arms 94—95 being sufficiently resilient to permit the threading of the film between the members 84—85 and against the surface 83, so that the rollers 96 and 97 may engage the film 1 in the space between the sound tracks 4 and 5. Thus these rollers 96 and 97 cause the film to flex transversely and assume the contour of the surface 83 and thus describe an arc, the centre of which is the axis of shaft 71.

The casing 81 is provided with an aperture 98 which is disposed transversely of the surface 83 but in alignment with the optical system 76 so that the light beam image from the exciter lamp 80 will be projected upon the respective sound track 3, 4, 5 or 6, and consequently through the aperture or slit 98 upon the photoelectric cell 82. In this manner the resistance of the photoelectric cell is varied and in turn causes the reproduction of sound through an amplifying system and loud speaker.

The rollers 96—97 are here shown as of relatively narrow width but where desired and possible, the same may be constructed with a curved surface to coincide with the surface 83 and to contact a greater area of the film 1 and thus hold it more firmly in its desired flexed position as it passes over the polished surface 83 to and from the straightening and guiding rollers 86—86' and 87—87'.

From the foregoing description taken in connection with the drawings, it is evident that the herein described and illustrated mechanism will operate to cause an intermittent scanning motion of the optical system so that the respective sound tracks 3, 4, 5 and 6 will have positioned thereat the proper projections of the light beam image from the optical system, and that with the shaft 71 the axis, the point of contact of the light beam upon the film, due to the curvature of the film, will always be the same. It is also apparent that through the shifting motor, the optical system will be automatically controlled to be moved and halted at its desired position through the contacts 9' and 10' and the notches 7 and 8 of the film. To return the optical system to normal position it is merely necessary to operate the handle or crank 66 to rotate the worm 65 in the opposite direction and thus move the shaft 71 and the optical system 76 to its starting or reset position.

What is claimed is:

1. In a sound-on-film reproducing apparatus employing a photographic film having a plurality of sound records arranged longitudinally thereon, an optical system mounted for axial swinging movements and for projecting a light beam image upon one of said records at a time, and means for swinging the said system to cause it to scan selectively one record at a time.

2. In a sound-on-film reproducing apparatus as claimed in claim 1 wherein the means for moving the optical system includes the film and means associated with the film and controlled thereby.

3. In a sound-on-film reproducing apparatus as claimed in claim 1, wherein the film adjacent the optical system is flexed traversely and wherein the optical system is moved upon an axis which is the centre of the flexure of the film.

4. In a sound-on-film reproducing apparatus as claimed in claim 1, wherein the film adjacent the optical system is flexed traversely and wherein the optical system is moved upon an axis which is the centre of the flexure of the film, and wherein electrical means is provided for imparting a step-by-step movement to the optical system from one record to the other, such action taking place at the end of one record and previous to the reversal movement of the film.

5. In a sound-on-film reproducing apparatus as claimed in claim 1, wherein the film adjacent the optical system is flexed traversely and wherein the optical system is moved upon an axis which is the centre of the flexure of the film, and wherein an electric motor is provided for imparting step-by-step swinging movement to the optical system and whereby manual means is provided for operating the motor shaft to return the optical system to re-set position.

6. In a sound-on-film reproducing apparatus, the combination of a casing, a film progressing mechanism mounted therein, a reversible electric motor for operating the same to cause the film to be moved in both directions, one direction at a time, a photographic film mounted therein and provided with a plurality of longitudinally parallel sound tracks, a film guiding mechanism with a curved film receiving surface on one side thereof, a photoelectric cell mounted in said guiding mechanism, said mechanism being provided with an aperture through the curved face thereof and leading to the cell, an oscillatable optical system disposed with its axis at right angles to the film guiding surface and with its axis the centre of a circle one arc of which is the curved face of the guiding surface, an electric motor operatably connected to the axis of the optical system for swinging the same in one direction, and co-operative means carried by the film and in the path thereof for controlling the energization of said motor and for de-energizing the same after the motor has been operated a pre-determined number of revolutions and the optical system has been swung a pre-determined distance.

7. In a sound-on-film reproducing apparatus as claimed in claim 6, in which manually controlled means is provided for returning the optical system to re-set position.

8. In a sound-on-film reproducing apparatus as claimed in claim 6, in which the motor for operating the film advancing mechanism is simultaneously controlled from the film for causing the reversing of the motor at the same time the circuit to the shifting motor is opened and the optical system has come to rest.

9. In a sound-on-film reproducing apparatus, the combination of a film having a plurality of longitudinally disposed and parallel sound tracks thereon, an axially swingable optical system disposed to project a light beam image upon one sound track at a time, means for moving and halting the optical system to scan one track at a time, and means for automatically causing the film to move past the optical system successively in opposite directions.

10. In a sound-on-film reproducing apparatus as claimed in claim 9, in which the optical system is automatically swung in one direction and halted so that the light image therefrom is projected successively upon the respective sound tracks.

11. In a sound-on-film reproducing apparatus as claimed in claim 9, in which automatically controlled step-by-step mechanism is provided for causing the optical system to swing and scan one sound track at a time.

12. In a sound-on-film reproducing apparatus, the combination of a casing, a film magazine mounted on the top of the casing, a second film magazine mounted at the bottom of the casing, reversible film progressing mechanism mounted in the casing, a film having a plurality of parallel longitudinally disposed sound tracks mounted within the casing and connected to both magazines, means mounted in the casing for receiving and flexing the film during the movement from one magazine to the other, said means being provided with an aperture and with a photoelectric cell receptacle, an optical system mounted for oscillatory movement adjacent to the film flexing means, the axis of which is the centre of a circle in which the flexed portion of the film forms one arc thereof, and an automatic means controlled by the film for imparting step-by-step scanning movement to the optical system.

13. In a sound-on-film reproducing apparatus as claimed in claim 12, in which additional automatic means is also provided and under the control of the film for controlling the film progressing means so that the film is halted and moved in alternate directions.

14. In a sound-on-film reproducing apparatus as claimed in claim 12, in which additional automatic means is also provided and under the control of the film for controlling the film progressing means so that the film is halted and moved in alternate directions, and wherein manual means is provided for returning the optical system to re-set position.

In testimony whereof I affix my signature.

LEE DE FOREST.